United States Patent [19]
Langström

[11] 3,743,369
[45] July 3, 1973

[54] CAGE FOR A ROLLING BEARING

[75] Inventor: Hakon Olof Scheibe Langström, Goteborg, Sweden

[73] Assignee: SKF Industrial Trading and Development Company NV, Amsterdam, Netherlands

[22] Filed: Sept. 8, 1971

[21] Appl. No.: 178,560

[52] U.S. Cl. .............................................. 308/201
[51] Int. Cl. ........................................... F16c 33/38
[58] Field of Search ......................... 308/201, 217

[56] References Cited
UNITED STATES PATENTS

| | | | |
|---|---|---|---|
| 1,712,222 | 5/1929 | Linde | 308/201 |
| 2,742,332 | 4/1956 | Cobb | 308/201 |
| 2,861,849 | 11/1958 | Case | 308/201 |

Primary Examiner—Charles J. Myhre
Assistant Examiner—Frank Susko
Attorney—Howson and Howson

[57] ABSTRACT

Cages of synthetic resin for rolling bearings, especially bearings operating at high speeds, comprises an annulus provided with a number of pockets at its internal surface. An axially directed ridge is arranged between any two pockets integral with the annulus and the collars defining said pockets to form a reinforcing framework, which will include two chambers for a lubricant adjacent to each pocket.

20 Claims, 6 Drawing Figures

3,743,369

CAGE FOR A ROLLING BEARING

CROSS REFERENCE TO RELATED APPLICATION

In my application Ser. No. 770,980 filed on Oct. 28, 1968, now U.S. Pat. No. 3,539,231, there is shown a "Cage for a rolling bearing" comprising an annulus provided with pockets for the guiding of rolling bodies. The present invention is a further development of the cage shown there.

BACKGROUND OF THE INVENTION

The present invention refers to cages of synthetic resin adapted for rolling bearings and being of the type having a number of collar shaped pockets for the retention of the rolling bodies arranged at the inner surface of an annulus having constant breadth.

Modern rolling bearings are designed for very high speeds. This means that the cages of these bearing will be subjected to very high centrifugal forces, which tend to deform the cage. The forces will with cages of conventional designs, and especially with cages made of synthetic resin, result in an bad guiding of the rolling bodies, which may bring about an unsatisfactory working, and ever peel the cage off the train of rolling bodies. The cage will then be jammed against the outer race ring and the bearing be brought out of operation.

The supply of lubricant to bearings operating a high speeds will also imply a difficult problem. On occasions it is of course possible to provide the bearing with mechanical lubricating means to provide an oil mist lubrication, or a flow of lubricant through the bearing, but such means will increase the costs considerably and will furthermore require a certain space. Such lubricating means are unsuitable in connection with non-stationary installations.

There remains the alternative of lubrication by grease, but with cages of conventional design the grease will be thrown towards the race of the outer ring, where the rolling bodies will catch it and transfer it to the race of the inner ring. Due to the difference in speed between the rolling bodies and the inner ring the grease will be thrown obliquely outwards. Part thereof, will adhere to the rolling bodies, but the major part will be lodged between adjacent rolling bodies and will, by the centrifugal force, again be thrown towards the race ofthe outer ring. When the grease has been worked in this manner for some time it will turn into a more easily flowing state, and may leak out of the bearing, which may run dry.

Other problems pertaining to grease lubrication of rolling bearings operating at high speeds is that the grease due to its inertia during start from standstill to high speed running will not accelerate sufficient rapidly. The grease will then be concentrated to one portion of the bearing, while other bearing portions during start-up will work with an unsatisfactory lubrication. During rapid changes in the operating speed the body of grease may be brought into rotation within the bearing.

The aim of the present invention is to provide a cage of synthetic resin adapted for a rolling bearing, which is cheap in manufacture, which in a satisfactory manner will withstand the tendencies to deformation during high speed operation and which furthermore will provide an efficient lubrication, where the disadvantages above mentioned are not at hand.

SUMMARY OF THE INVENTION

The invention is characterized in an axial ridge located between any two adjacent collars being integral with the latter as well as with the annulus and having a height substantially equal to that of the collars, said annulus, collars and ridges together forming a reinforcing framework as well as two chambers for the reception of a lubricant located at and substantially enclosing each rolling body.

The reinforcing ridges will serve two purposes, viz: to make the cage better suited to withstand the deformations caused by centrifugal forces and further, together with the annulus and the collars, to form chambers for a lubricant, in which the latter will be uniformly distributed around the bearing irrespective of rapid changes in the running speed.

A further characterizing feature of the invention is that the cage is provided with side walls, which further increase the rigidity thereof and better define the chambers for the lubricant.

DESCRIPTION OF THE PREFERRED EMBODIMENTS

Figure 1:
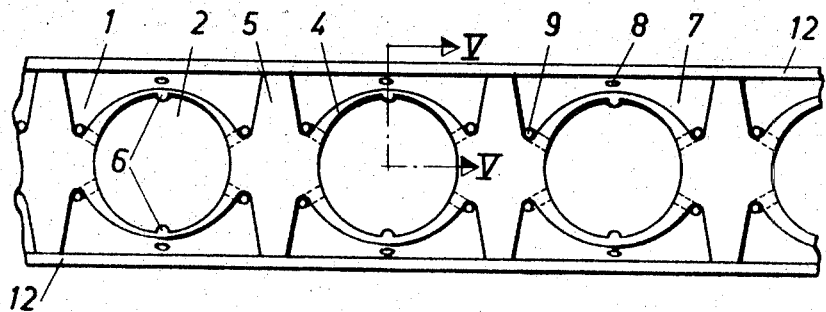
FIGS. 1 – 4 show portions of different types or cages as utilized with deep groove ball bearings, where the portions of the cages for the sake of simplicity are illustrated as straight ribbons.

FIG. 1 shows a portion of a cage centered by means of the rolling bodies and consisting of an annulus 1 having a constant breadth and provided with a number of pockets 2, each defined by a collar 4 intended to support a rolling body. An axial ridge 5 integral with the annulus is fitted between any two adjacent collars. These ridges 5 are connected to the collars and form together with the other two components a reinforcing framework which in this embodiment is produced as a single member. The thickness of the collars 4 decreases in the direction away from the ridges 5, as well as away from the annulus 1. The thinnest portion of each half of the collar is intermediate the adjacent ridges provided with a projection 6, which extends into the pocket. The two projections of a pocket will thus be located diametrically opposite to each other, and the distance between them is somewhat less than the diameter of the rolling body, whereby the cage will be centered by the train of rolling bodies.

The breadth of the ridges varies in the axial direction in such a manner that each ridge will have its broadest portion where it joins the adjacent collars, whereas it tapers away in both directions to show narrow ends at the edges of the annulus 1. The latter, the collars 4 and the ridges 5 together form a number of chambers 7 which are evenly distributed around the bearing, and which, in pairs will substantially enclose each rolling body. As the annulus will run fairly close to the outer race ring a very satisfactory lubrication will be provided at which the disadvantages above mentioned have been eliminated.

Each chamber 7 is connected to the external face of the annulus by way of a passage 8, which starts at a point close by the transient portion between the annulus 1 and the pertaining collar 4. The area of this passage is so choosen that a careful metering of lubricant to the race of the outer ring will be obtained. A further passage 9 for the supply of lubricant to the step of the outer race ring is located where the collar 4 merges into one of the ridges 5.

The ridges 5 terminate in this embodiment just short of the edges of the annulus 1, and the peripheral portions of the inner surface of the annulus outside the ridges and the end faces of the latter together form attachments for external side walls 12, formed as separate members of disc-like form having a central apperture.

Figure 2:
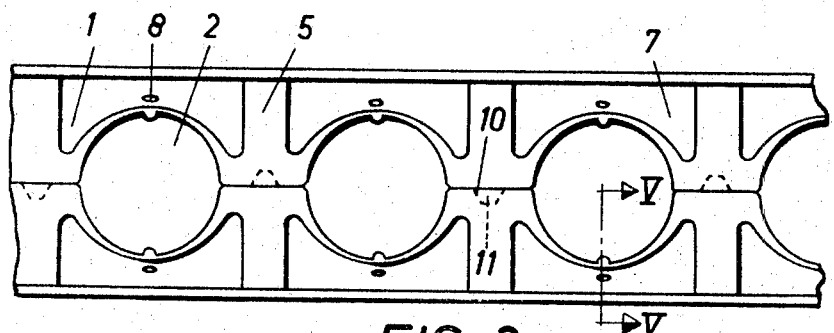

FIG. 2 shows a somewhat modified embodiment of a cage likewise centered by the rolling bodies. Here, however, the ridges 5 extend as far as to the edges of the annulus 1 and form attachments for side walls 12. In this embodiment there are no passages 9 for the lubricant leading from the chambers 7 to the step of the outer race ring. The ridges have a constant breadth from the joint at the collars 4 to the edges of annulus. The cage is in this embodiment made in two identical half-portions, which at the faces intended to be joined alternatingly are provided with recesses 10 and spigots 11, which are located at the base of the ridges and guide the two half-portions during the fitting together operation.

Figure 3:
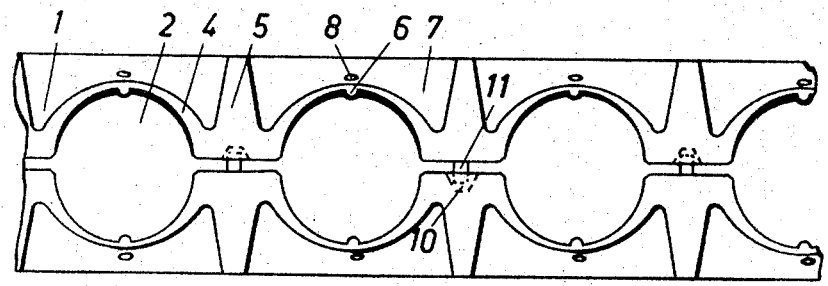

The two half-portions are designed to be joined by ultra-sonic welding. FIG. 3 shows an advantageous form of the recesses 10 and the spigots 11. The cage according to FIG. 3 mainly corresponds to that of FIG. 2, but is shown just before fitting together. The ridges are tapering as in FIG. 1 and no side walls 12 are fitted. The recesses 10 and the spigots 11 are specially suited for ultra-sonic welding, which utilizes the well known fact that two faces vibrating together will generate heat, whereby they will be welded together. The high vibratory energy produced at ultrasonic frequencies will be utilized to rub the surfaces against each other.

With the embodiment shown in FIG. 3 the recesses 10 are axially directed, truncated conical voids, whereas the spigots 11 are cylindrical and have the same or somewhat smaller diameter than that of the bottom part of recess. The length of the spigots 11 exceeds the depth of the recesses 10, and during the welding operation the material of the spigots will fill the conical voids.

To increase the strength of the cage it may be advantageous to join also the juxtaposed faces of the ridge portions together by welding. In order to prevent the welds between the faces Of the ridge portions to squeeze excess material into the pockets, which would disturb the operation of the rolling bodies, the mating faces of the ridge portions are bevelled at their edges adjacent the pockets. By utilizing ultra-sonic welding for joining two half-portions of a cage a considerable saving in manufacturing costs is attained.

Figure 4:
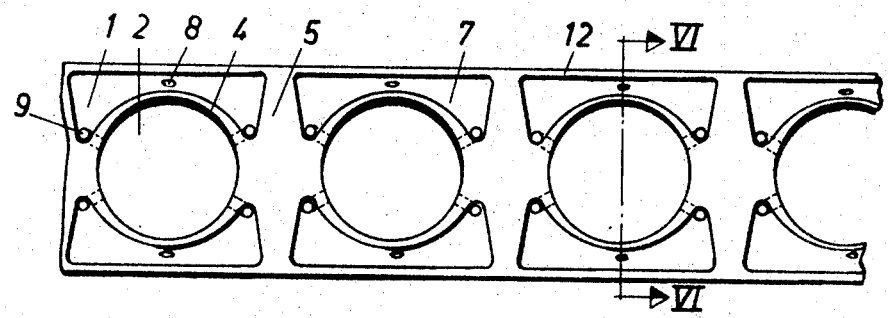

The cage shown in FIG. 4 differs from the previous ones in that it is centered by way of the outer race ring and there is thus no need for any projections 6. The cage here furthermore is provided with integral side walls 12, which will closely define the chambers 7 for the lubricant. The cage is shown as made in one piece, but it may of course also be manufactured in two half-portions to be joined in the same manner as described in connection with FIGS. 2 and 3.

Figure 5:
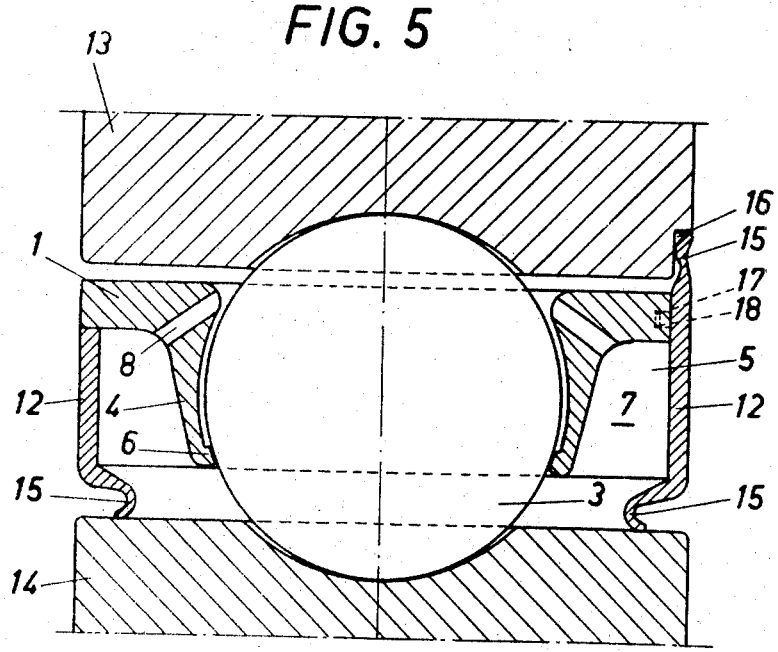
FIG. 5 shows sections along lines V — V in FIGS. 1 and 2, said sections, to save space, being composed into a single figure.

The left half of FIG. 5 shows a partial section through the embodiment of FIG. 1, and the right half thereof shows a corresponding section through FIG. 2. Both cages are utilized with deep groove ball bearings having of an outer race ring 13 and an inner race ring 14, between which a number of balls 3 operate. These balls are guided by, but act to centre the cage. As shown on the drawings the internal face of the collar 4 follows the surface of the ball, but does not make contact with the latter. The centering is brought about solely by the projections 6. As the portions of the collar, where the projections are located, are thinner than the remainder of the collar the first mentioned portions will obtain the elasticity necessary to guarantee a safe alignment between the projections 6 and the balls 3.

The location of the passages 8 for the lubricant is clearly shown in this figure. The height of the ridges 5 substantially corresponds to that of collars. The cage is made of synthetic resin and in the embodiment shown on the left part of the figure the ridges 5 terminate just inside the edge of the annulus 1. A side separate wall member 12 is fitted at each side of the cage, and is bonded to the end faces of the ridges as well as to the projecting internal face of the annulus. The side walls here serve as a sealing and contact the inner race ring by way of an elastic sealing lip 15.

In the right half of the figure the ridges 5 extend all the way to the edge of the annulus. The side wall 12 is also made of synthetic resin and it is attached to the end faces of the ridges by means of spigots 18 which are introduced into recesses 17 therein. The side walls 12 may advantageously be bonded to the framework of the cage by ultra-sonic welding. The side wall also here forms a sealing, which is provided with sealing lips 15 for engagement with the inner race ring 14 as well as with a recess 16, at the side face of the outer race ring.

Figure 6:
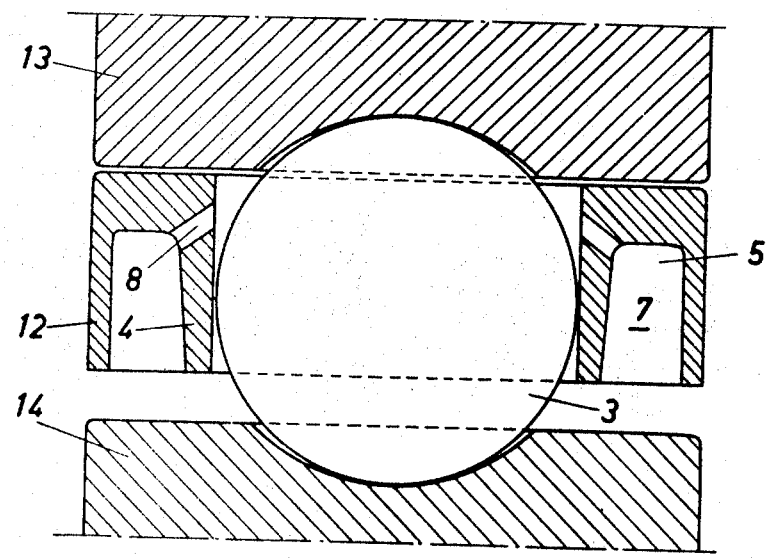
FIG. 6 shows a section along line VI — VI in FIG. 4.

FIG. 6 shows a section through the cage of FIG. 4 along line VI — VI, this cage also being utilized with a deep groove ball bearing. The cage is centered by way of the outer race ring and the shape of the pockets 4 does not correspond to that of the balls, but is substantially cylindrical, no projections 6 being required. This cage is provided with integral side walls 12, which in this embodiment are plane and have the same extension as the height of the ridges 5. The side walls may, however, be formed as separate members and be provided with sealing lips as in FIG. 5.

The invention offers a way of producing roller bearings in a cheap manner, provides an efficient guiding of the rolling bodies and makes possible a satisfactory lubrication, while the disadvantages mentioned in the introduction are not at hand.

The embodiments all refer to deep groove ball bearings, but the invention is not limited to that specific type, which has been used as illustrative example only, but may also be used with other known types of rolling bodies.

I claim:

1. An improved cage of synthetic resin for the rolling bodies of a rolling bearing, especially the balls of a deep groove ball bearing, said cage having an annulus of constant breadth, and a number of pockets, each pocket being adapted to retain one of said rolling bodies and being defined by a collar provided at the inner surface of said annulus and extending inwardly therefrom, wherein the improvement comprises an axial ridge provided at the inner surface of said annulus and between any two adjacent collars, said ridge being integral with said two collars as well as with the annulus and having a height substantially equal to that of collars, said annulus, collars and ridges together forming a reinforcing framework as well as two chambers for the reception of a lubricant, located at and substantially enclosing each of said rolling bodies.

2. A cage assembly for a rolling bearing having at least an outer ring and a plurality of rolling elements, the cage comprising a circumferentially extending annulus, a plurality of collars depending from the annulus and defining circumferentially spaced separated pockets for lack of the rolling elements, and means defining at least one lubricant chamber for each of the rolling elements adjacent each pocket, each of said chambers opening radially and having at least one opening to provide fluid communication between said lubricant chamber and pocket whereby upon operation of the bearing, lubricant is metered through each said opening which is remote from the open end of each chamber adjacent said annulus.

3. A cage as claimed in claim 2 including a lubricant chamber on each side of each of said pockets.

4. A cage as claimed in claim 2 further comprising external side walls extending radially inwardly from the annulus.

5. A cage as claimed in claim 4 wherein the side walls are integral with the framework of the cage.

6. A cage as claimed in claim 2 wherein the side walls are separate members attached to said annulus.

7. A cage as claimed in claim 1 comprising two prefabricated annular, identical half-portions, each including one half of the annulus, one half of each collar and one half of each ridge, joined by ultra-sonic welding along the ridge portion end faces confronting each other, said end faces being alternately provided with spigots and recesses, the recesses being of less depth than the height of the spigots but having a greater cross sectional area, whereby during the welding operation the material of the spigots will melt and fill the recesses.

8. A cage as claimed in claim 1 wherein the framework is produced as a single element.

9. A cage as claimed in claim 1 wherein the breadth of the ridges decreases from the portion thereof joined to the collars in the direction towards the outer edges of the annulus.

10. A cage as claimed in claim 1 wherein the ridges have a constant breadth along their full length.

11. A cage as claimed in claim 2 including ridges extending axially out to the edges of the annulus, and side walls having an external diameter at least as great as that of the annulus.

12. A cage as claimed in claim 1 including side walls and wherein the ridges in the axial direction terminate just inside the edges of the annulus, by a distance corresponding to the thickness of the side walls, said side walls being fitted within the annulus.

13. A cage as claimed in claim 1 for a rolling bearing having an outer race ring, wherein said framework has at least one passage for feeding lubricant from each chamber to the rolling body enclosed between each pair of chambers as well as to the outer race ring.

14. A cage as claimed in claim 11 wherein the framework is centered with respect to the rolling bodies carried therein by means of at least one pair of projections arranged diametrically opposite to each other at the radially innermost portions of each collar.

15. A cage as claimed in claim 14 wherein the thickness of the collar decreases in the direction away from the annulus, showing the thinnest section at the projections.

16. A cage as claimed in claim 14 wherein the thickness of the collars decreases in the peripheral direction towards the porjections.

17. A cage as claimed in claim 1 for a rolling bearing having an outer race ring wherein the annulus is adapted to be centered by the outer race ring.

18. A cage as claimed in claim 12 wherein the side walls are attached to the framework in a face-to-face relationship by means of spigot-and-recess connections.

19. A cage as claimed in claim 18 wherein the side walls are formed of synthetic resin and are bonded to the framework by ultrasonic welding.

20. A cage as claimed in claim 2 for a folling bearing having two race rings, wherein said side walls include sealing members adapted to engage at least one of the race rings.

* * * * *